United States Patent [19]

Norrie et al.

[11] Patent Number: 4,498,378
[45] Date of Patent: Feb. 12, 1985

[54] VACUUM CONTAINER FOR MEAT PRODUCTS

[75] Inventors: Lyle W. Norrie, Etobicoke; Robert W. Snider, King City; Knud Simonsen, Nobleton, all of Canada

[73] Assignee: Knud Simonsen Industries Limited, Rexdale, Canada

[21] Appl. No.: 529,522

[22] Filed: Sep. 6, 1983

[51] Int. Cl.³ .......................... A23B 4/02; B01F 7/16
[52] U.S. Cl. ........................................ 99/472; 99/348; 99/535; 220/420; 366/139; 366/249; 366/279
[58] Field of Search ................. 99/472, 532, 533, 535, 99/516; 366/139, 249, 251, 325, 223, 279; 426/266, 281, 519, 641; 17/25; 220/420, 421, 425; 206/829, 524.8

[56] References Cited

U.S. PATENT DOCUMENTS

| | | | |
|---|---|---|---|
| 2,767,962 | 10/1956 | Blackburn | 220/420 X |
| 3,934,860 | 1/1976 | Michels et al. | 366/325 X |
| 4,038,426 | 7/1977 | Jespersen et al. | 426/266 |
| 4,214,518 | 7/1980 | Petsche | 99/535 |
| 4,356,762 | 11/1982 | Langen | 99/535 X |

FOREIGN PATENT DOCUMENTS 2460113  2/1981  France .................... 99/535

Primary Examiner—Timothy F. Simone

[57] ABSTRACT

Apparatus for processing meat sections under atmospheric pressure and under a high vacuum, and having, a container of generally square cross-section and having an open top, reinforcing members attached at spaced apart intervals on the exterior of each of the side walls and further reinforcing members on the exterior of the bottom wall, a closure for the top to hermetically seal it, a stirring shaft and arms supported on the closure and a stirring motor with a shaft extending through the closure to the stirring shaft, reinforcing bars extending across the upper surface of the closure, and a hose connection on the closure for connection to a suitable vacuum pump.

5 Claims, 5 Drawing Figures

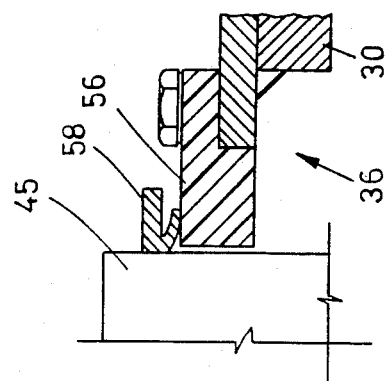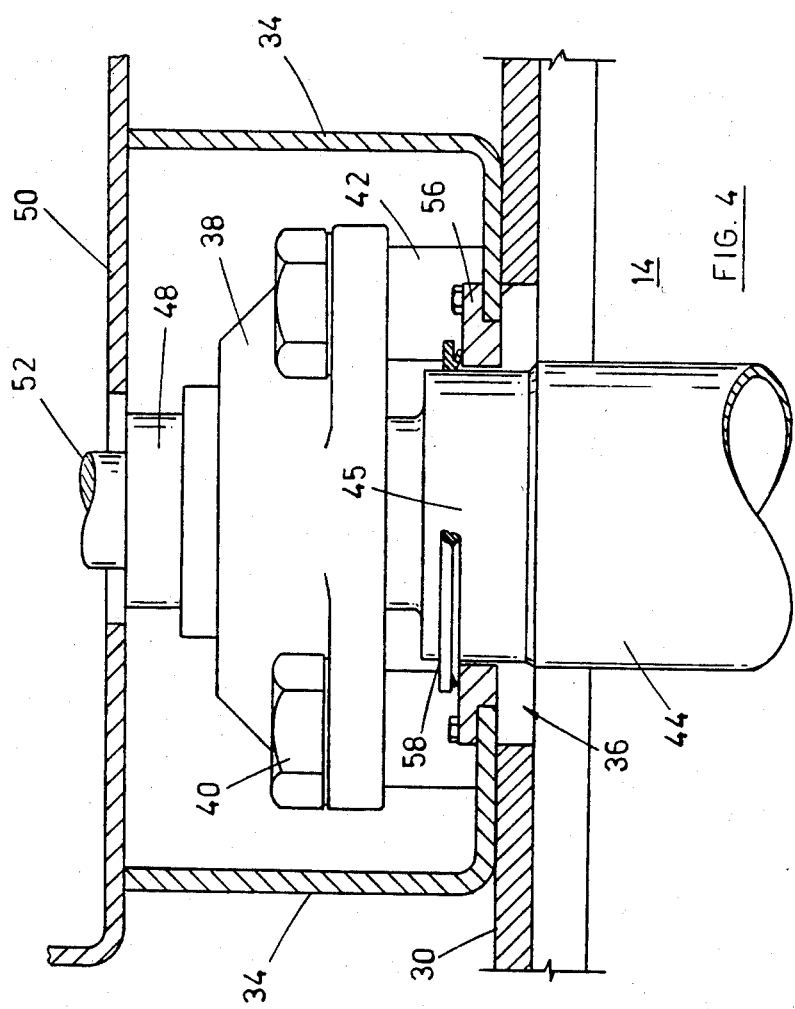

VACUUM CONTAINER FOR MEAT PRODUCTS

The invention relates to a container for processing meat products under vacuum.

BACKGROUND OF THE INVENTION

Meat products such as ham, picnics, shoulders and briskets are usually subjected to a pickling stage after which they may be further processed by cooking, smoking, packing, slicing and the like. The process carried out during the pickling stage usually involves injecting a quantity of a liquid solution usually a brine solution into the meat sections, after which the meats sections are simply placed in a container or tank, and allowed to cure for many hours. In the past, this curing stage simply involved sufficient time to allow the injected brine to disperse into the meat sections. More recently however it has been the practice to subject the meat sections to a moderate agitation or stirring action, while they remain in the tank. This provides a massaging function which tends to speed up the dispersion of the brine in the meat. In addition, it is also found that it causes the development of a gelatinous mixture of liquid protein and some exuded brine, which then assists in combining the meat sections into the finished product during the later processing stages. One form of apparatus in which this process may advantageously be carried out with excellent results is shown in U.S. Pat. No. 4,038,426. It has, however, been found that when cured or pickled in this way, with the accompanying massaging or stirring action, small air bubbles may develop in some of the meat sections. When the meat sections are then combined into the finished product, typically a ham, for example, these small air pockets appear as voids in the product when it is being sliced, and have an unsightly appearance.

Clearly, it is desirable to as far as possible eliminate such air bubbles. One process by which this has been achieved in the past is to subject the meat sections to a high vacuum during the stirring operation. The equipment by which this has been carried out in the past has usually been a special vacuum chamber, and has involved the transferring of the meat sections from the curing container or tank to the vacuuming chamber. This involves considerable additional labour, and the vacuum chamber must be cleaned before each new batch of product is placed in it.

It would be advantageous if the vacuuming step could be carried out in the same container as that in which the initial curing or pickling stage is carried out.

As shown in the U.S. patent mentioned above, this container it typically a rectangular container, having an open top, and provided with a stirring device which can be lowered down into the container. The stirring device is coupled to a motor by means of which it may be slowly rotated. In the past, such stirring devices were simply mounted on a support bar or open framework so that the top of the container remained open. However, using the type of container shown in the earilier patents, this would not have been possible. In addition, there was no vacuuming attachment suitable for applying a vacuum to such a container.

It is therefore a general objective of the invention to provide a container for the processing of meat sections, such a container being suitable for the initial storage and pickling of such meat sections at atmospheric pressure, after which, by interchanging the stirring mechanism, and by providing a novel form of top closure, the meat sections can be further processed while being stirred under a high vacuum.

BRIEF SUMMARY OF THE INVENTION

With a view to overcoming the foregoing disadvantages, the invention comprises a container for the processing of meat sections, both under atmospheric pressure and under a high vacuum, such container having a generally flattened bottom wall and generally planar side walls defining a generally square cross section, and having an open top, a plurality of reinforcing channel sections attached at spaced-apart intervals along each of said side walls, on the exterior thereof and further reinforcing means on the exterior of the bottom wall, whereby to resist implosion due to vacuum within such container, said container being adapted to receive stirring means for stirring of such meat sections during processing under atmospheric conditions, and having a top edge around the upper edges of said four side walls adapted to receive a closure member, and a closure member for said top edge adapted to hermetically seal the same, and stirring mechanism supported on said closure member, and stirring motor means supported above said closure member, and having drive means extending from said motor, through said closure member into driving connection with said stirring means, and reinforcing means extending across the upper surface of said closure means for resisting implosion forces, and hose connection means on said closure means for connection to suitable vacuum pump means.

More particularly, the invention provides such a processing container incorporating a drain opening means at its lower end, and a hose connection means attached thereto, whereby the contents of such container may be transferred therefrom upon completion of processing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 4 is a section along line 4—4 of FIG. 1, and,

FIG. 5 is an enlarged section of part of FIG. 4.

DESCRIPTION OF A SPECIFIC EMBODIMENT

Figure 3:
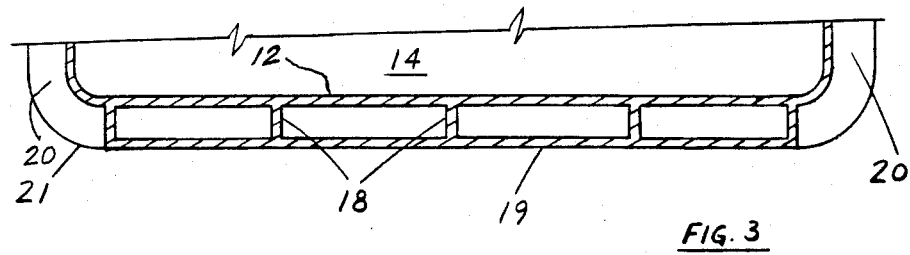
FIG. 3 is a section along line 3—3 of FIG. 1.
Figure 2:
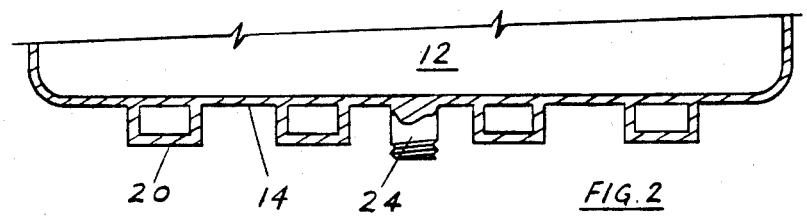
FIG. 2 is a section along line 2—2 of FIG. 1.

As shown in the drawings, the invention comprises a processing tank indicated as 10, which is provided with a bottom wall, 12 and four side walls, 14, forming a generally square shape in section, and having an open top, 16.

The bottom wall is of planar metallic plate, typically being stainless steel for food processing cleanliness, as are side walls, 14. They may be formed, and joined by any suitable techniques, typically by welding, and will have radiussed corners and a smooth interior to insure that they may be thoroughly cleansed after each use.

Around the exterior of bottom wall 12, there is provided a plurality of spaced apart reinforcing ribs, 18.

Ribs 18 are welded to the underside of wall 12, and are further reinforced by an outer plate 19 welded to the edges of ribs 18. In this way, a series of rigid box-like channel sections are created (see FIG. 3) which effectively withstand implosion forces when a vacuum is drawn within the tank.

It will be appreciated that a greater number of such ribs 18 may be provided, or a fewer number, depending upon the size of the tank.

On the side walls, 14, a plurality of spaced apart reinforcing channels, 20, is provided, having lower radiussed portions, 21, extending around to the reinforcement on bottom wall, 12.

Such reinforcement is of course provided entirely on the outside of such bottom and side walls, so as to avoid interference with the interior which would impede processing.

Channels 20, a planar web 20a and two side portions 20b continuously welded along their edges to the side walls 14. In this way, a plurality of rigid box-sections is provided to further resist implosion forces.

The ends of the channels 20 are also closed in and welded so as to prevent the entry of food residues or dirt into the spaces enclosed by such channels 20.

By suitable arrangement of the dimensions and metal gauge of ribs 18 and channels 20, a sufficient degree of strength can be built into such bottom wall and side walls that they will resist implositon forces.

Preferably, in accordance with one of the objectives of the invention, a drain opening collar 22, is provided at the bottom of one of the side walls 14, which may have threads 24, which can be connected to a suitable transfer pipe (not shown).

In this way, it is possible to readily transfer the contents of the container to another piece of apparatus through such pipe when processing has been completed.

The four side walls 14, together define a top edge 26, lying in a common plane surrounding the open mouth 16.

Such containers 10, are of the same standard dimensions as are those shown in earlier U.S. Pat. No. 4,038,426, and are adapted to receive the same stirring means supported on the same support crossbar as is shown in such patent.

In this way, the containers 10, can first of all be used for processing meat sections in the ordinary way, i.e., by storage or pickling for a certian period of time while being subjected to a slow massaging or stirring action under atmospheric pressure.

Figure 1:
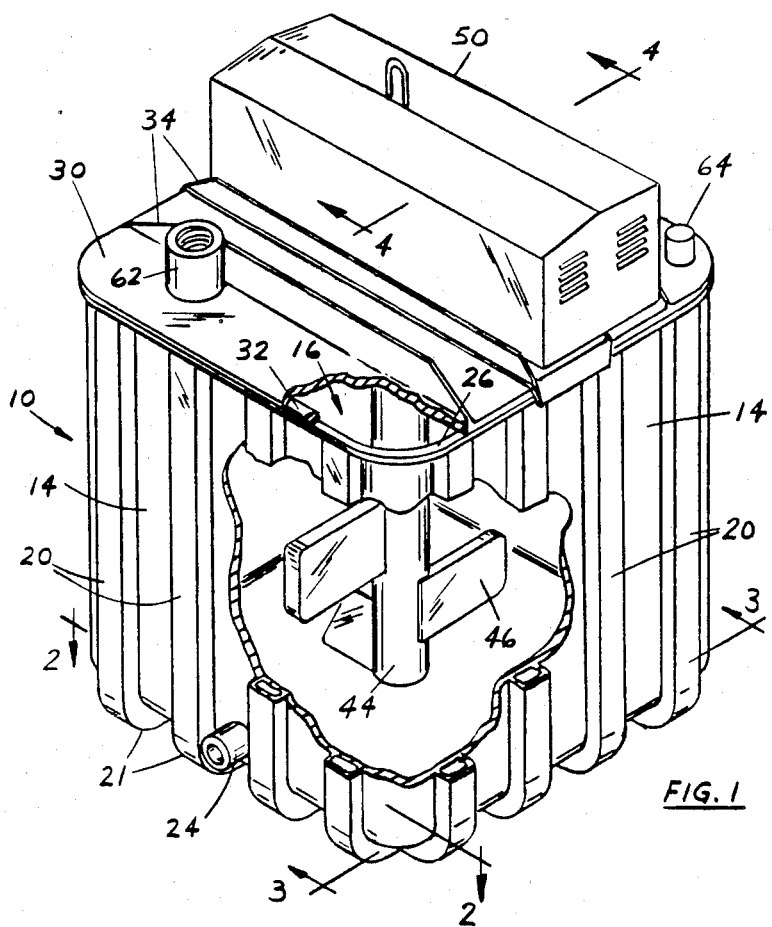
FIG. 1 is a perspective illustration of a processing tank according to the invention, partially cut away to reveal its interior.

In order to complete such processing in accordance with the invention, further apparatus is provided, as shown in FIGS. 1 and 4. This comprises the closure top member, 30, which is of generally square shape in plan, and is adapted to fit over the top edge, 26, on the container 10. It incorporates a suitable, compressible seal around the edge, indicated generally as 32, for making a good hermetic seal. Its under surface is smooth and its upper surface is provided with a plurality of spaced-apart reinforcing bars 34, to resist implosion forces. An oversize through opening, 36, is formed centrally of closure top 30, and a bearing, 38, is supported in registration with opening 36, by means such as bolts 40, and posts 42.

A stirring shaft 44, having a neck 45, extends downward through opening 36 into the interior of container 10, and is provided with a plurality—in this case, four—of generally rectangular-shaped stirring arms 46. An upper drive sleeve portion 48, is fastened interiorly of shaft 44 and extends upwardly therefrom through bearing 38. A drive motor and reduction gear assembly (not shown) are contained within a generally rectangular drive housing 50, and a drive shaft 52, extends downwardly therefrom into sleeve 48, and is fastened by any suitable means.

In order to provide a good hermetic seal around the shaft 44, an anti-friction seal bearing 56, is secured surrounding opening 36 spaced from shaft 44. A generally flexible resilient sealing ring 58, is frictionally secured to shaft 44 adjacent to seal bearing 56. A flexible sealing membrane 60, is formed integrally with sealing ring 58, and extends downwardly and outwardly therefrom at an angle into engagement with the seal bearing 56.

The closure member 30, is provided with a vacuum hose connector 62, and acts as a connection to any suitable form of vacuum hose by the usual type of plumbing hose fixture.

A vacuum release tap 64, may also optionally be provided, although this can of course be incorporated in the hose connection 62.

Suitable one-way valves will also be incorporated in accordance with the normal practice.

If desired, the closure top 30, can also be provided with an observation panel or window and a pressure gauge (not shown).

In operation, the container 10, is first of all filled with meat sections, and the meat sections are processed at atmospheric pressure by stirring, using apparatus such as that shown in the earilier U.S. patent.

When this stage of processing is almost completed, which may be anywhere up to 12 to 24 hours in a normal case, the stirring assembly is then raised and removed from the container, and the container may then be transferred, typically by a forklift truck or other conveyer means, to another location.

At this other location, the closure member 30, with its associated stirring mechanism will then be lowered into the container 10. By means of the vacuum hose attachment 62, air from within the container 10, will be evacuated down to a high degree of vacuum, and stirring will then continue for a period, which may be a half hour or so.

During this time, substantially all of the air bubbles incorporated in the meat sections will be eliminated and the entrained air withdrawn.

The vacuum is then released, and the closure top 30 is removed, and the contents of the tank 10 are then transferred for further processing, typically through the drain opening 22 by a suitable vacuum hose (not shown).

Thus, by the use of a sufficient number of containers 10 and typically only one, or a small number of, vacuuming closure members, meat sections can all be subjected to the vacuuming stage without the necessity for investing in a complete re-equipment of vacuuming tanks land stirring mechanisms and without the need for transferring meat sections from storage tanks to a special vacuuming chamber as was carried out in the past.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Container apparatus for the processing of meat products, both under atmospheric pressure and under a high vacuum, and comprising:

a container having a generally flattened bottom wall and generally planar side walls defining a generally square cross section having inner and outer surfaces, and having an open top;

a plurality of reinforcing channel sections located at spaced-apart intervals along each of said side walls, on the exterior thereof and on the exterior of the bottom wall, said reinforcing channels being of generally uniform three-sided shape having continuous side portions welded on the exterior of said walls of said container, and a continuous planar web portion extending between said side portions spaced from said container walls thereby forming, with said container walls, continuous generally tubular enclosures of rectangular cross-section, whereby to resist implosion due to vacuum within said container;

a top edge around the upper edges of said four side walls adapted to receive a closure member;

a closure member for said open top of said container adapted to hermetically seal the same;

stirring mechanism supported on said closure member, and stirring motor means supported above said closure member, and having drive means extending from said motor, through said closure member into driving connection with said stirring means;

reinforcing means extending across the upper surface of said closure member for resisting implosion forces, and, hose connection means on said closure member for connection to suitable vacuum pump means.

2. Container apparatus for processing of meat sections as claimed in claim 1 incorporating drain opening means at the lower end of such container and a hose connection means attached thereto, whereby the contents of such container may be transferred therefrom upon completion of processing.

3. Container apparatus as claimed in claim 1 wherein said side walls and said bottom wall are joined by radiussed corner wall portions, and including radiussed reinforcing channels extending around such corner wall portions and joining ends of said side wall reinforcing chanels.

4. Container apparatus as claimed in claim 3 including reinforcing ribs on the upper side of said closure member, spaced apart from one another and extending from side to side in parallel relation.

5. Container apparatus for the processing of meat sections, both under atmospheric pressure and under a high vacuum, and comprising:

a container having a generally flattened bottom wall and generally planar side walls defining a generally square cross section, and having an open top;

a plurality of reinforcing channel sections attached at spaced-apart intervals along each of said side walls, on the exterior thereof and further reinforcing means on the exterior of the bottom wall, whereby to resist implosion due to vacuum within such container, wherein said channels are of generally three-sided shape having continuous side portions welded on said walls of said container, and a planar web portion extending between said side portions spaced from said container walls, thereby forming with said container walls continuous generally tubular enclosures of rectangular cross-section;

a top edge around the upper edges of said four side walls adapted to receive a closure member;

a closure member for said open top of said container adapted to hermetically seal the same;

stirring mechanism supported on said closure member, and stirring motor means supported above said closure member, and having drive means extending from said motor, through said closure member into driving connection with said stirring means;

said drive means being a cylindrical shaft, and including a sealing portion on said closure member and a sealing ring supported by said drive shaft, and a resilient sealing flange thereon contacting said sealing portion, and being movable into close sealing contact therewith in response to a vacuum in said container;

reinforcing means extending across the upper surface of said closure member for resisting implosion forces, and, hose connections means on said closure member for connection to suitable vacuum pump means.

* * * * *